United States Patent [19]

Miller et al.

[11] 4,238,520

[45] Dec. 9, 1980

[54] LOW-FAT COMESTIBLE SPREAD SUBSTITUTES

[75] Inventors: Donald E. Miller, Strongsville; Charles E. Werstak, Medina, both of Ohio

[73] Assignee: SCM Corporation, N.Y.

[21] Appl. No.: 53,044

[22] Filed: Jun. 28, 1979

Related U.S. Application Data

[63] Continuation-in-part of Ser. No. 930,037, Aug. 1, 1978, abandoned.

[51] Int. Cl.³ .......................... A23D 3/00; A23D 5/00
[52] U.S. Cl. ..................... 426/573; 426/578; 426/604; 426/804
[58] Field of Search ............... 426/573, 575, 602, 603, 426/604, 578, 804

[56] References Cited

U.S. PATENT DOCUMENTS

| | | | |
|---|---|---|---|
| 2,143,651 | 1/1939 | Fisher et al. ................. | 426/603 X |
| 2,552,706 | 5/1951 | Bertram ....................... | 426/602 X |
| 2,609,300 | 9/1952 | Storrs et al. .................. | 426/602 |
| 2,622,984 | 12/1952 | Peebles et al. ................ | 426/603 |
| 3,085,015 | 4/1963 | Schram ........................ | 426/602 X |
| 3,108,004 | 10/1963 | Klostermann ................. | 426/602 X |
| 3,343,966 | 9/1967 | Loewenstein ................. | 426/603 X |
| 3,360,377 | 12/1967 | Spitzer et al. ................ | 426/604 |
| 3,366,492 | 1/1968 | Voss et al. ................... | 426/603 |
| 3,391,002 | 7/1968 | Little ........................... | 426/575 |
| 3,418,133 | 12/1968 | Hijhoff ......................... | 426/603 |
| 3,425,842 | 2/1969 | Japikse ........................ | 426/602 |
| 3,490,919 | 1/1970 | Moran ......................... | 426/604 X |
| 3,917,859 | 11/1975 | Terada et al. ................ | 426/602 |
| 3,944,680 | 3/1976 | van Pelt et al. .............. | 426/564 |
| 4,071,634 | 1/1978 | Wilton et al. ................. | 426/604 |
| 4,084,012 | 4/1978 | Krumel et al. ............... | 426/604 X |
| 4,103,037 | 7/1978 | Bodor et al. ................. | 426/575 |
| 4,107,343 | 8/1978 | Petricca ...................... | 426/564 |

*Primary Examiner*—Robert A. Yoncoskie
*Attorney, Agent, or Firm*—Richard H. Thomas

[57] ABSTRACT

A low-fat comestible spread which is plastic in consistency similar in properties to margarine or other such spreads, and process for making same. The spread comprises an oil-in-water emulsion having stably dispersed therein about 20% to about 40% fat, a lipoidal emulsifier, a water soluble or dispersible thickening agent for the water, and advantageously, flavor and colorant, the fat having a Wiley Melting Point in the range of about 75° F. to about 106° F., a solid-fat index at 92° F. not substantially greater than about 20 and a solid-fat index at 100° F. not substantially greater than zero. A preferred emulsifier is a normally plastic partial fatty acid ester of a polyalcohol having an HLB value less than about 5. A preferred thickening agent is a cellulose ether, advantageously in combination with a thixotropic thickening agent. The process features homogenizing the thickened oil-in-water emulsion with the fat advantageously in molten condition, then setting up the emulsion in a plastic state by cooling same.

26 Claims, No Drawings

… …

LOW-FAT COMESTIBLE SPREAD SUBSTITUTES

The present application is a continuation-in-part of prior application Ser. No. 930,037, now abandoned, on "Low-Fat Margarine Substitute", filed Aug. 1, 1978, and assigned to assignee of the present application.

The present invention relates to novel low-fat comestible spreads. The present invention will be particularly described with reference to a spread which resembles margarine or butter in taste, texture and appearance, but it will be apparent to those skilled in the art that the present invention also has application to other viscous, or what can be termed plastic, spreads, for instance a spread resembling mayonnaise or a cheese spread in taste, texture and appearance.

BACKGROUND OF THE INVENTION

Conventional margarine contains about 80% fat. Low-calorie margarine substitute products are well known and on the market which have a much lower fat content, for instance about 40% to 60% by weight fat. One such spread is disclosed in U.S. Pat. No. 3,360,377 to Spitzer et al. The spread of this patent is identified as a low-calorie margarine substitute in the form of a water-in-oil emulsion. In all of the examples of the patent, the fat content is about 39%. The essence of the method of this patent appears to reside in the steps taken to assure that the water-in-oil emulsion is formed and maintained.

Also typical of the prior art is U.S. Pat. No. 4,071,634, to Wilton et al, describing a low-fat spread containing a continuous plastic fatty phase and a dispersed protein aqueous phase, the aqueous phase containing both phosphatides and fatty phase. The total fat content in the examples of this patent appears to be within the range conventionally employed in prior art spreads.

The reason why the art has not gone to lower percentages by weight in fat content is the difficulty experienced in maintaining oil as the continuous phase; that is, preparing a stable emulsion. Both of the above patents are directed to the problem of improving emulsion stability. A fat in a margarine substitute should have a melting point and dilatometric profile close to that of fat in a margarine so that it is quickly melted when used, for instance on corm or toast, and can be consumed without leaving a waxy mouth-feel. However, fats generally used for the preparation of margarine substitutes have melting points and dilatometric profiles more appropriate for achieving emulsion stability than duplicating the properties of fats used in conventional margarine.

BRIEF DESCRIPTION OF THE PRESENT INVENTION

The present invention resides in the discovery that a low-fat containing oil-in-water emulsion can be prepared which has the properties of a non-flowable margarine, or other such spreads, wherein the fat employed is the discontinuous phase. By not relying upon the fat for emulsion stability, a fat more suitable for duplicating the properties of butter or other such spreads can be utilized. At the same time, the fat content is substantially reduced, providing a spread which is lower in calorie content than conventional margarine substitutes or spreads.

Specifically, the present invention resides in the preparation of a low-fat comestible spread, similar in properties to a non-flowable margarine or other such spreads, comprising an oil-in-water emulsion having stably dispersed therein about 20% to about 40%, preferably about 20% to about 28%, of a fat; an oil soluble or dispersible lipoidal emulsifier; a water soluble or dispersible edible thickening agent; and butter or other flavor and colorant; the fat having a Wiley Melting Point in the range of about 75° F. to about 106° F., a solid-fat index at 92° F. of less than about 20, and a solid-fat index at 100° F. not substantially greater than zero, the proportions of ingredients being such as to produce a consistency similar to a non-flowable margarine or other spread.

In the practice of the present invention, the low-fat spread is prepared by heating a portion of the water to an elevated temperature, for instance about 180° F. to 190° F., and then adding to such water the water soluble or dispersible ingredients such as the edible thickening agent plus colorant. The remainder of the water is then added, followed by admixing with the water a pre-blend of the fat and fat soluble or dispersible ingredients such as the emulsifier and flavorant, and then homogenization and cooling of the entire mixture.

Salt may be added to enhance flavor, preferably subsequent to homogenization and cooling.

The spread of the present invention has the same mouth-feel, organoleptic qualities, taste and appearance as margarine or other such spreads, melts down in the same way as margarine or other such spreads, and has good stability, with no phase separation after three months at 40° F.

For purposes of the present application, the term "consistency similar to a non-flowable margarine or other spread" shall mean that the spread of the present invention shall be in a highly viscous, non-flowable, spoonable state and plastic in consistency, at normal temperatures. The consistency can be deemed to be intermediate a flowable state and a hard or brittle state. The term "normal" or "normally" unless otherwise indicated shall mean that phase condition which exists from refrigeration to ordinary room or ambient temperature, e.g., 38°–90° C. A unique characteristic of the spread of the present invention is that it is plastic at both refrigeration temperature, e.g. 38° F., and at high room temperature, e.g. 90° F.

Also, for purposes of the present application, the term "homogenization" means that process of putting incompatible or immiscible components into a stabilized suspension in a liquid medium. Many types of homogenization equipment have been developed to perform this function. Most conventional types of homogenizers function by passing the product under pressure between closely clearing but relatively fixed surfaces. The high velocity, hydraulic shear, pressure release and impact rend the dispersed phase into a very fine state of subdivision of the order of 1 micron or smaller in diameter.

DETAILED DESCRIPTION OF THE PRESENT INVENTION

The fat phase of the present invention can be any low melting point fat having a Wiley Melting Point in the range of about 75° to about 106° F., preferably about 75° F. to about 98° F., and a solid-fat index as above specified, or a blend of a fat with a liquid oil such as corn oil, the proportions of such blend being such as to meet the above specifications.

One suitable low melting point fat is Cirol (trademark, SCM Corporation), a partially hydrogenated cottonseed, soybean oil blend having a Wiley Melting Point of about 91° to 95° F. and an approximate solid-fat index profile as listed below, along with such typical profile for butterfat (which also can be used for part or all of the fat in the instant product):

TABLE 1

| Temperature, °F. | Approximate Solid-Fat Indices | |
|---|---|---|
| | Cirol | Butterfat |
| 50 | 32 1 | 31 |
| 70 | 22.9 | 12 |
| 80 | 16.7 | 9 |
| 92 | 5.5 | 3 |
| 100 | 0 | 0 |

Cirol has a free fatty acid content of about 0.05% maximum.

Another suitable low melting point fat is Kaola (trademark, SCM Corporation), a partially hydrogenated soybean, coconut oil blend having a Wiley Melting Point of about 87°–93° F. and an approximate solid-fat index of:

| Temperature, °F. | Approximate Solid-Fat Index |
|---|---|
| 50 | 45–56 |
| 70 | 10–14 |
| 80 | 5–6 |
| 92 | 1–2 |
| 100 | 0 |

Kaola has a free fatty acid content of 0.05% maximum.

Coconut oil (Wiley Melting Point of about 76° F.) may also be used.

A preferred fat useful in the process of the present invention for blending with a liquid oil is a fractionated hydrogenated vegetable oil marketed under the trademark Kaomel (trademark, SCM Corporation), a blend of cottonseed and soybean oils having Wiley Melting Point in the range of about 97° F. to about 101° F. and an approximate solid-fat index as shown in the following Table 2:

TABLE 2

| Temperature, °F. | Approximate Solid-Fat Indices | |
|---|---|---|
| | Kaomel | Elaidinized Blend |
| 50 | 72 | 61 |
| 70 | 63 | 49 |
| 80 | 55 | 42 |
| 92 | 25 | 16 |
| 100 | 5 max. | 0.6 |
| 110 | 0 | 0 |

A similar cottonseed/soybean blend hydrogenated to obtain an elaidinized fat useful in the present invention has a Wiley Melting Point of about 100°–101° F. and SFI data also as shown in the above Table 2. This fat is also useful by itself.

Another suitable fat useful in a hard fat-oil blend in the composition of the present invention is Paramount XX (trademark, SCM Corporation) having a Wiley Melting Point of 117° to 119° F. and a solid-fat index of:

| Temperature, °F. | Approximate Solid-Fat Index |
|---|---|
| 50 | 68 |
| 70 | 58 |
| 80 | 52 |
| 92 | 30 |
| 100 | 19 |
| 110 | 12 max. |

Still another suitable fat useful in a hard fat-oil blend in the composition of the present invention is Satina AB (trademark, SCM Corporation) having a Wiley Melting Point of 89° to 93° F. and a solid-fat index of:

| Temperature, °F. | Approximate Solid-Fat Index |
|---|---|
| 50 | 70–76 |
| 70 | 65–71 |
| 80 | 53–59 |
| 92 | 2 max. |
| 100 | 0 |

Hydrogenated palm kernel oil may also be used in the composition of the present invention, having a Wiley Melting Point of 95°–111° F., in a blend with an edible oil.

Any edible oil conventionally employed in foods can be used, for instance cottonseed oil (IV 99–121); peanut oil (IV 84–102); safflower oil (IV 138–151); soybean oil (IV 125–138); sunflower oil (IV 122–139); and corn oil (IV 110–128). The Iodine Value of typical butterfat is 25–42. A blend of 45% corn oil and 55% Kaomel gives a fat phase having a Wiley Melting Point of about 92.8° F. and a solid-fat index profile of:

| Temperature, °F. | Approximate Solid-Fat Index |
|---|---|
| 50 | 30–40 |
| 70 | 19–29 |
| 80 | 10–20 |
| 92 | 0–4 |
| 100 | 0 |

The advantage of employing a blend of an oil such as corn oil and a high solids fat such as Kaomel is that it can provide a highly polyunsaturated lipid phase having a polyunsaturated/saturated (p/s) ratio of 1 or more. Refined corn oil and Kaomel, when used in the proportion of 45% oil/55% Kaomel, gives a p/s ratio of 1, calculated as follows:

TABLE 3

| | % Cis-Cis MIPUFA* | % Saturated FA** |
|---|---|---|
| Corn Oil | 57.0 | 14.6 |
| Kaomel | 0.0 | 34.4 |

$$\frac{0.57 \times 45}{0.146 \times 45 + 0.344 \times 55} = \frac{25.65}{25.49} \simeq 1$$

*Methylene Interrupted Polyunsaturated Fatty Acid
**Fatty Acid

Kaomel has a high elaidic acid content so that it has a relatively low saturated fatty acid content. Thus when used in the above proportions with corn oil, the desired p/s ratio of 1 or more is obtained. By contrast, a hard fat such as Paramount XX has a much lower elaidic acid content and a relatively higher saturated fatty acid content. To obtain a p/s ratio of 1 or more, the blend would have to contain as much as 79% cottonseed oil with only 21% Paramount XX. This would not provide a fat blend having a Wiley Melting Point in the range of about 75° to about 98° F., and thus would not provide an emulsion having the functionality (consistency) of the highest quality of table margarine or other such spread. The functionality of margarine could be obtained with a much higher Paramount XX content, and such a blend of Paramount XX and cottonseed oil, by way of example, could be employed if the p/s ratio was not a consideration.

The oil soluble or dispersible lipoidal emulsifier is a critical component of the present invention. Normally, for an oil-in-water emulsion, one skilled in the art would select a high HLB emulsifier favoring such as emulsion. In the present invention it was found unexpectedly that a low HLB, plastic, lipoidal emulsifier, in combintion with the thickening agent, to be described, gave the relatively stiff plastic emulsion consistency desired. By plastic emulsifier, it is meant normally semi-solid or pasty in consistency, at room temperature, as compared to either hard or fluid. By lipoidal, it is meant fat-resembling. Thus, preferred emulsifiers useful in the process of the present invention are plastic partial fatty acid esters of polyalcohols, such as the partial fatty acid esters of glycerol and propylene glycol, having a low HLB value, not substantially greater than about 5, and a Capillary Melting Point less than about 135° F. (but sufficiently high to have a normally plastic consistency). A particularly preferred partial fatty acid ester of glycerol is a mono- and diglyceride such as Dur-em 204 (trademark, SCM Corporation), a mono- and diglyceride from hydrogenated vegetable oil having 52% minimum α-monoglyceride. This emulsifier has an IV of 65–75 and a Capillary Melting Point of 120°–130° F. Also useful in the process of the present invention is a 40% α-monoglyceride, such as Dur-em 114 (trademark, SCM Corporation), having a Capillary Melting Point of 110°–120° F. and an IV of 70–80. Both Dur-em 204 and Dur-em 114 have HLB values of about 2.8. Still another useful partial glycerol ester emulsifier is Myverol 18–85 (trademark, Eastman Chemical Products, Inc.), a distilled monoglyceride having about 90% minimum monoglyceride, and a congeal point of 115° F. (Capillary Melting Point about 130° F.).

An example of a suitable fatty acid ester of propylene glycol is a monopalmitate or monomyristate, having a propylene glycol monoester content of 50% minimum, an HLB value of about 3, and a Capillary Melting Point less than about 125° F.

Another class of emulsifiers useful in the present invention, of low HLB value and plastic in consistency (Capillary Melting Point less than about 135° F.) are the glyceryl-lacto esters of fatty acids, such as a glycerol-lacto palmitate or glycerol-lacto myristate having an HLB value of about 2.4 and a Capillary Melting Point of less than about 115° F. These compounds have a monoglyceride content of about 7–12%.

It is possible to employ a blend of emulsifiers, such as a blend of an ethoxylated mono- and diglyceride with a mono- and diglyceride. For instance, Durfax EOM (trademark, SCM Corporation), an ethoxylated mono- and diglyceride having a saponification value of 65–75, an hydroxyl value of 65–80, a Capillary Melting Point of about 80°–85° F. and an HLB value of about 13.1 can be blended with a mono- and diglyceride. One such blend is a combination of about 6% Durfax EOM and about 94% Dur-em 204 or Dur-em 114.

Also, one could use a blend of propylene glycol monoesters and mono- and diglycerides such as EC-25 (trademark, SCM Corporation) having a Capillary Melting Point of 95°–105° F. and an HLB value of about 2.6.

The fat content, exclusive of the emulsifier, should be in the range of about 20–40%, preferably about 20–28%, based on the entire weight of the emulsion. The small proportion of emulsifier employed should be an emulsifying amount which, when combined with other ingredients of the spread, gives a stable oil-in-water emulsion after homogenization and at lower temperatures; and a viscosity of at least 100,000 centipoises at refrigeration to room temperatures.* Preferably, the emulsifier is present in an amount of about 1–5%, and more preferably 2–5%, also based on the entire weight of the emulsion.

* As determined on a Brookfield Synchro-Lectric Viscometer Model RVT utilizing a Brookfield Helipath Stand (Model C) and bars TA to TF.

The thickening agent of the present invention can be broadly any edible water dispersible or soluble thickener conventionally employed in foods. Typical such thickeners are gum arabic; gum tragacanth; gum karaya; locust bean gum; guar gum; agar-agar; algin or alginates; carrageenan; pectin; gelatin; starch and starch derivatives; algin derivatives such as propylene glycol alginate; cellulose derivatives such as carboxymethyl cellulose, methyl cellulose and hydroxypropyl cellulose; and low methoxyl pectin.

The concentration of thickening agent employed is largely dependent upon the particular thickener employed. The main criterion is that it be present in a thickening amount sufficient to provide substantially the consistency of conventional margarine or other such spread in the finished product.

Preferably, the thickening agent of the present invention is one having surface active properties. Thus, a preferred class of thickening agents are the cellulose ethers, prepared for instance by reacting cellulose with appropriate chemical reagents in the presence of caustic soda. Included are such compounds as hydroxypropylmethyl cellulose (Methocel K, trademark, Dow Chemical Company), methyl cellulose (Methocel A, trademark, Dow Chemical Company), hydroxybutylmethyl cellulose (Methocel HB, trademark, Dow Chemical Company), and hydroxypropyl cellulose (Klucel, trademark, Hercules, Inc.). An especially preferred such compound is Methocel K-100M (trademark, Dow Chemical Company), having a viscosity of about 100,000 centipoises (viscosities herein are determined by ASTM method D-2363-65T). Effective results were also obtained with other such cellulose ether compounds commercially available, such as Methocel K-15M (viscosity 15,000 centipoises), and Methocel K-100 (viscosity 100 centipoises).

An advantage in the use of the emulsifiers of the present invention and the cellulose ethers in combination is that the combination provides an unexpectedly viscous, stable emulsion, even in the presence of as little as about 20% fat. The reason for this is not known, although the effect of use of these two ingredients appears to be synergistic, that is, greater than would be expected from combined use of the ingredients. Specifically, the emulsifier and thickener in small proportions provide a viscosity of more than 100,000 to four million centipoises (as determined on the RVT Brookfield Viscometer, supra).

In a preferred embodiment of the present invention, a combination of thickening agents was used; hydroxypropylmethyl cellulose (e.g., Methocel K-100M, trademark, The Dow Chemical Company); and Avicel (trademark, FMC Corporation), the latter a mixture of 89% cellulose gel (microcrystalline cellulose) and 11% cellulose gum (sodium carboxymethyl cellulose). The Methocel K-100M advantageously is used in a proportion of about 0.25–2.00%, based on the entire weight of the composition, and the Avicel is used in a proportion of about 0.25% to 1.25%, also based on the entire weight of the composition. The advantage in using the above combination of thickening agents is that the Avicel, in addition to causing thickening of the emulsion, imparts a high thixotropy to same, thereby enhancing spreading characteristics of the spread when used. In addition, this thickening agent assists in the homogenization of the product.

It is characteristic of the present invention that proteins such as skim milk solids, sodium caseinate and sodium protein isolate will not normally be used, although small amounts in combination with a gum such as carrageenan, to give the desired thickening or bodying effect, could if desired be employed. In this respect, it is understood that the formulations of the present invention can also contain certain other typical ingredients such as flavorings (e.g., butter flavors, cheese flavors, and mayonnaise flavors), colorants, vitamins, minerals, and other such ingredients which do not in small amounts contribute directly to the functional or organoleptic properties of the formulation. Carbohydrates, such as corn syrup solids, lactose, fructose, dextrose, and sucrose, and maltodextrins could also be added to impart sweetness to the spreads of the present invention.

The following Examples are illustrative of the concepts of the present invention. In the following Examples, percentages are percentages by weight and temperatures are in degrees Fahrenheit, unless otherwise specified.

EXAMPLE 1

In this Example, the following formulation was employed:

TABLE 4

| Ingredient | Percent |
| --- | --- |
| Refined de-waxed corn oil | 11.25 |
| Hydrogenated cottonseed-soybean oil (Kaomel) | 13.75 |
| Emulsifier, Dur-em 114 (40% minimum α-monoglyceride) | 4.0 |
| Hydroxypropylmethyl cellulose (Methocel K-100M) | 0.5 |
| Salt | 1.5 |
| Cellulose gel and cellulose gum (Avicel RC 581) | 0.5 |
| Artificial Butter Flavor 4177 (trademark, Crompton & Knowles) | 0.1 |
| Beta-carotene | 0.09 |
| Water (some added as ice) | 68.31 |
| Total | 100.00 |

The spread of the present invention was prepared by heating about one-half of the water in a vat to 190° F., then adding the thickening agents (Methocel and Avicel) to the heated water. The water was held at this temperature for 15 minutes with continuous mixing. The color (beta-carotene) then was added.

The remainder of the water then was added as ice to the heated mixture, reducing the temperature to 70° F. This procedure insures solution of the Methocel, which precipitates at elevated temperatures, into the water. The mixture was then reheated to 130° F., and a premelted blend of the fats, emulsifier and flavor was added thereto. The heating was intensified to obtain a temperature of about 155° F., and this temperature was held for about 30 minutes. Then the mixture was homogenized with the fat still molten at about 2,000–1,000 psig, in a continuous two-stage dairy type homogenizer, to produce a fine particle size emulsion. The salt was mixed into the resulting plastic mixture subsequent to this homogenization and cooling of the homogenized emulsion to about 60° F. The spread then was packaged in suitable containers and stored at 40° F. until used. This cooling developed viscosity of four million centipoises, as measured by the Brookfield Viscometer (supra), a property which was not fully lost upon rewarming to room temperature (70° F). At 70° F., the product was still plastic in the sense it was still spoonable.

The spread of this Example had virtually the same consistency, taste, and appearance as a good conventional table margarine. Such spread can be maintained 3 months at 40° F. without phase separation.

Other ingredients can be added to the emulsion in accordance with known techniques in the art. For instance, different colorants can be added and different flavorings and sweeteners can be used, for instance corn syrup solids, maple syrup and honey.

To obtain a high p/s (polyunsaturated fat to saturated fat) ratio, the normally liquid oil of the present invention when used in a blend with a normally solid fat should have a large amount of polyunsaturation (linoleic acid). Corn oil has 57% linoleic acid; sunflower oil, 68% safflower oil, 77%; cottonseed, 53% soybean, 53% (all approximate). The conventional margarine referred to in this application is a table margarine for use on toast, etc., as distinguished from a baker's margarine compounded for special baking tasks. The ultimate melting characteristic of the useful fats at 100° F. for the instance product, for best organoleptic character, preferably is one that yields absolutely no solids, but a maximum of several percent solids at this temperature can be tolerated with modest product impairment if the Wiley Melting Point characteristic is met.

EXAMPLE 2

In this Example, the following formulation was employed:

TABLE 5

| Ingredient | Percent |
| --- | --- |
| Elaidinized fat of Table 2 | 20.0 |
| Emulsifier, Dur-em 114 (40% minimum α-monoglyceride) | 4.0 |
| Hydroxypropylmethyl cellulose (Methocel K-100M) | 0.5 |
| Salt | 1.5 |
| Cellulose gel and cellulose gum (Avicel RC 581) | 0.5 |
| Special margarine flavor (Standard Brands, included in fat) | 1.0 |
| Beta-carotene | 0.09 |
| Sodium benzoate and potassium sorbate | 0.1 each |
| Water (some added as ice) | 72.21 |
| Total | 100.00 |

The spread was prepared following the procedure of Example 1. The spread has virtually the same consistency, taste, and appearance as a good conventional table margarine, similar to Example 1. On cooling to about 40° F., the spread had a viscosity of about four million centipoises; and as in Example 1, a spoonable, very plastic viscosity at room temperature (70° F.).

EXAMPLE 3

This example illustrates the preparation of a low-fat spread having a consistency similar to that of a good mayonnaise.

The following formulation was employed:

TABLE 6

| Ingredient | Percent |
| --- | --- |
| Refined de-waxed corn oil | 11.25 |
| Hydrogenated cottonseed-soybean oil (Kaomel) | 13.75 |
| Emulsifier, Dur-em 114 (40% minimum α-monoglyceride) | 3.0 |
| Hydroxypropylmethyl cellulose (Methocel K-100M) | 0.5 |
| Salt | 1.5 |
| Cellulose gel and cellulose gum (Avicel RC 581) | 0.5 |
| Beta-carotene | 0.08 |
| Sodium benzoate and potassium sorbate | 0.1 each |
| Water (some added as ice) | 70.31 |
| Total | 100.00 |

The spread was made by the procedure of Example 1. On cooling to about 40° F., the spread developed a viscosity of about 200,000 centipoises, as measured by the Brookfield Viscometer (supra). A high quality mayonnaise, for instance Hellmann's Real Mayonnaise, has a viscosity of about 224,000 centipoises.

EXAMPLE 4

This Example illustrates the preparation of a low-fat spread having a consistency, taste, and appearance similar to a high quality pasteurized, processed cheese spread.

The following formulation was employed:

TABLE 7

| Ingredient | Percent |
| --- | --- |
| Elaidinized fat of Table 2 | 23.0 |
| Emulsifier, Dur-em 114 (40% minimum α-monoglyceride) | 2.0 |
| Hydroxypropylmethyl cellulose (Methocel K-100M) | 0.5 |
| Salt | 0.5 |
| Cellulose gel and cellulose gum (Avicel RC 581) | 0.5 |
| Cheese Powder (trademark, Borden Company) | 15.0 |
| Sodium benzoate and potassium sorbate | 0.1 each |
| Water (some added as ice) | 58.3 |
| Total | 100.0 |

The spread was prepared following the procedure of Example 1, and on cooling, developed a viscosity of two to three million centipoises, as measured by the Brookfield Viscometer (supra). By comparison, a cheese spread "Cheez Whiz", a pasteurized, processed cheese spread manufactured by the Kraft Company, has a viscosity of about 2,600,000 centipoises.

It is understood that, in place of the cheese flavor of this Example, one could add other flavors, such as fruit flavors, maple flavors and the like.

What is claimed is:

1. A low-fat comestible spread consisting essentially of a fat, an oil soluble or dispersible lipoidal emulsifier, a water soluble or dispersible, edible thickening agent having surface active properties, and water, wherein said spread is an oil-in-water emulsion having about 20% to about 40% by weight of a low melting point fat; the proportions of ingredients being such as to produce an emulsion having a plastic consistency and a Brookfield viscosity of at least about 100,000 centipoises through a temperature range of about 38° F., to 90° F., said plastic consistency being similar to that of a mayonnaise, cheese spread or non-flowable margarine; said fat having a Wiley Melting Point in the range of about 75° F. to about 106° F. and a solid-fat index at 100° F. not substantially greater than zero; said emulsifier being plastic in consistency having a Capillary Melting Point less than about 135° F. and an HLB value not substantially greater than 5.

2. The comestible spread of claim 1 wherein said fat is present in the proportion of about 20% to about 28% based on the total weight of the spread, said fat having a solid-fat index at 92° F. not substantially above about 20.

3. The comestible spread of claim 2 wherein said lipoidal emulsifier is a normally plastic partial fatty acid ester of a polyalcohol and is present in the proportion of about 1% to about 5% based on the weight of the spread.

4. The comestible spread of claim 3 wherein said thickening agent is a cellulose ether.

5. The comestible spread of claim 3 wherein said thickening agent comprises a blend containing major proportions of a cellulose ether and microcrystalline cellulose, and a minor proportion of sodium carboxymethyl cellulose.

6. The comestible spread as defined in claim 5 having thixotropic properties.

7. The comestible spread of claim 3 wherein said thickening agent comprises, based on the weight of the spread, about 0.5–3.25% of a blend of about 0.25–2.0% of hydroxypropylmethyl cellulose and about 0.25–1.25% of a mixture of about 8 parts by weight microcrystalline cellulose to about 1 part by weight sodium carboxymethyl cellulose, said spread having a viscosity in the range of about 100,000 to about four million centipoises.

8. The comestible spread as defined in claim 7 having thixotropic properties.

9. The comestible spread of claim 2 wherein said fat is a blend of a normally liquid edible oil and a normally solid hydrogenated vegetable fat, in the proportions necessary to give said Wiley Melting Point and solid-fat index, said normally liquid oil having a sufficiently high linoleic acid content and said normally solid fat having a sufficiently low saturated fatty acid content to obtain, when used in said proportions, a p/s ratio of 1 or more.

10. The comestible spread of claim 9 wherein said normally liquid oil is corn oil (IV 110–128), and said normally solid fat is a hydrogenated vegetable oil having a Wiley Melting Point in the range of about 97° F. to about 101° F., an approximate solid fat index of

| Temperature °F. | Approximate Solid Fat Index |
| --- | --- |
| 50 | 72 |
| 70 | 63 |
| 80 | 55 |
| 92 | 25 |
| 100 | 5 max. |
| 110 | 0 | and a saturated fatty acid content of about 34%.

11. A low-fat comestible spread in the form of an oil-in-water emulsion consisting essentially, based on the weight of the spread, of
  about 20% to about 40% of a low melting point fat having a Wiley Melting Point in the range of about 75° F. to about 106° F. and a solid-fat index at 100° F. of not substantially greater than zero;
  about 2% to about 5% of a normally plastic partial glycerol ester emulsifier having a Capillary Melting Point less than about 135° F. and an HLB value not substantially greater than about 5;
  about 0.5% to about 3.25% of a thickening agent comprising major proportions of hydroxypropylmethyl cellulose and microcrystalline cellulose and a minor proportion of sodium carboxymethyl cellulose; and
  water;
  said comestible spread having a consistency similar to that of a mayonnaise, cheese spread or non-flowable margarine.

12. The comestible spread as defined in claim 11 having thixotropic properties.

13. The comestible spread of claim 11 wherein said fat is a blend of normally liquid edible oil and a normally solid hydrogenated vegetable fat, in the proportions necessary to give said Wiley Melting Point and solid-fat index, said normally liquid oil having a sufficiently high linoleic acid content and said normally solid fat having a sufficiently low saturated fatty acid content to obtain, when used in said proportions, a p/s ratio of 1 or more.

14. The comestible spread of claim 13 wherein said normally liquid oil is corn oil (IV 110–128) and said normally solid fat is a hydrogenated vegetable oil having a Wiley Melting Point in the range of about 97° F. to about 101° F., an approximate solid-fat index of

| Temperature °F. | Approximate Solid Fat Index |
|---|---|
| 50 | 72 |
| 70 | 63 |
| 80 | 55 |
| 92 | 25 |
| 100 | 5 max. |
| 110 | 0 | and a saturated fatty acid content of about 34%.

15. The comestible spread of claim 11 wherein said thickening agent comprises, based on the weight of the spread, about 0.25–2.00% hydroxypropylmethyl cellulose and about 0.25–1.25% of a mixture of about 8 parts by weight microcrystalline cellulose and 1 part by weight sodium carboxymethyl cellulose, the spread having a Brookfield viscosity in the range of about 100,000 to four million centipoises through a temperature range of about 90° F. to 38° F.

16. A method of making the comestible spread of any of claims 1–15, inclusive, comprising the steps of dispersing the thickening agent in the water, forming an oil-in-water emulsion of said water and the lipoidal and lipoidal soluble ingredients, and homogenizing the emulsion to a fine particle size, salt being added in flavoring amounts and mixed into the spread subsequent to homogenization.

17. A process for making a low-fat comestible spread consisting essentially of fat, water, an oil-in-water lipoidal emulsifer, and water soluble or water dispersible, edible thickening agent, said process comprising:
  mixing together the above ingredients in the proportions on a weight basis of about
  20 to 40% low melting point fat; 0.5 to 3.25% thickening agent, about 2–5% emulsifier and water;
  said emulsifier being a plastic partial fatty acid ester of polyalcohols having an HLB value less than about 5 and a Capillary Melting Point less than about 135° F.;
  said fat having a Wiley Melting Point between about 75° F. and about 106° F. and a solid-fat index at 100° F. not substantially greater than zero;
  said thickening agent comprising a blend of a cellulose either and a gum capable of imparting thixotropic properties to said spread;
  emulsifying, at an elevated temperature sufficient to make the fat molten, said fat and lipoidal emulsifier in water containing said thickening agent dispersed therein to form an oil-in-water emulsion; and
  cooling the resulting emulsion to a temperature sufficiently low to provide a plastic consistency in the finished product similar to that of a non-flowable spread, said emulsion having a Brookfield viscosity in the range of about 100,000 to about four million centipoises through a temperature range of about 90° F. to 38° F.

18. The process of claim 17 wherein said fat is present in a proportion of about 20% to about 28% based on the total weight of the spread, said fat further having a solid-fat index at 92° F. of not substantially above about 20.

19. The process of claim 18 wherein said lipoidal emulsifier is a normally plastic partial fatty acid ester of glycerine or propylene glycol.

20. The process of claim 19 wherein said thickening agent comprises, based on the weight of the spread, about 1–2% of a blend of about 0.25–2.0% of hydroxypropylmethyl cellulose and about 0.25–1.25% of a mixture of about 8 parts by weight microcrystalline cellulose to about 1 part by weight sodium carboxymethyl cellulose.

21. The process as defined in claim 20 wherein the emulsion has thixotropic properties.

22. A low-fat comestible margarine-like spread in the form of an oil-in-water emulsion, consisting essentially of, based on the weight of the spread,
  about 20% to about 40% of a low melting point fat having a Wiley Melting Point in the range of about 75° F. to about 106° F. and a solid-fat index at 100° F. of not substantially greater than zero;
  wherein at least a portion of said fat is a hydrogenated blend of cottonseed and soybean oil having a Wiley Melting Point in the range of about 97° F. to about 101° F. and an approximate solid-fat index of

| Temperature °F. | Approximate Solid Fat Index |
|---|---|
| 50 | 72 |
| 70 | 63 |
| 80 | 55 |
| 92 | 25 |
| 100 | 5 max. |
| 110 | 0 | about 2% to about 5% of a normally plastic partial glycerol ester emulsifier having a Capillary Melting Point less than about 135° F. and an HLB value not substantially greater than about 5;

about 0.5% to about 3.25% of a thickening agent comprising major proportions of hydroxypropylmethyl cellulose and microcrystalline cellulose and a minor proportion of sodium carboxymethyl cellulose; and water;

said comestible spread having a consistency similar to non-flowable margarine.

23. A low-fat comestible margarine-like spread in the form of an oil-in-water emulsion consisting essentially of, based on the weight of the spread, about 20% to about 40% of a low melting point fat having a Wiley Melting Point in the range of about 75° F. to about 106° F. and a solid-fat index at 100° F. of not substantially greater than zero;

wherein at least a portion of said fat is an elaidinized fat obtained by hydrogenating a blend of cottonseed oil and soybean oil having a Wiley Melting Point in the range of about 100° F. to 101° F. and an approximate solid-fat index of

| Temperature °F. | Approximate Solid-Fat Index |
|---|---|
| 50 | 61 |
| 70 | 49 |

-continued

| Temperature °F. | Approximate Solid-Fat Index |
|---|---|
| 80 | 42 |
| 92 | 16 |
| 100 | 0.6 |
| 110 | 0 | about 2% to about 5% of a normally plastic partial glycerol ester emulsifier having a Capillary Melting Point less than about 135° F. and an HLB value not substantially greater than about 5;

about 0.5% to about 3.25% of a thickening agent comprising major proportions of hyroxypropylmethyl cellulose and microcrystalline cellulose and a minor proportion of sodium carboxymethyl cellulose; and water;

said comestible spread having a consistency similar to that of a non-flowable margarine.

24. The spread of claims 22 or 23 wherein said low melting point fat is a blend of said elaidinized fat and a normally liquid edible oil.

25. The spread of claim 24 wherein said normally liquid edible oil is corn oil.

26. The spread of claims 22 or 23 further comprising a flavoring selected from the group consisting of butter flavors, margarine flavors, cheese flavors, mayonnaise flavors, fruit flavors and maple flavors.

* * * * *